United States Patent [19]

Weiland

[11] 4,154,557
[45] May 15, 1979

[54] HELICOPTER ROTOR STRUCTURE

[75] Inventor: Emil Weiland, Hohenbrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 824,240

[22] Filed: Aug. 12, 1977

[30] Foreign Application Priority Data

Aug. 25, 1976 [DE] Fed. Rep. of Germany ....... 2638166

[51] Int. Cl.² .............................................. B64C 11/12
[52] U.S. Cl. .................................. 416/141; 416/134 A
[58] Field of Search .................... 416/134 A, 135, 136, 416/138 A, 140 R, 140 A, 141

[56] References Cited

U.S. PATENT DOCUMENTS

| 1,777,630 | 10/1930 | Vaughn | 416/140 A |
| 2,755,869 | 7/1956 | Magill | 416/104 |
| 3,219,122 | 11/1965 | Montgomerie et al. | 416/136 |
| 3,885,887 | 5/1975 | Desjardins | 416/135 X |

FOREIGN PATENT DOCUMENTS

| 148641 | 2/1937 | Austria | 416/202 |
| 858708 | 12/1940 | France | 416/202 |
| 1172254 | 2/1959 | France | 416/102 |
| 358771 | 4/1938 | Italy | 416/202 |
| 657689 | 9/1951 | United Kingdom | 416/102 |
| 957314 | 5/1964 | United Kingdom | 416/202 |

*Primary Examiner*—Everette A. Powell, Jr.
*Attorney, Agent, or Firm*—W. G. Fasse; D. F. Gould

[57] ABSTRACT

The blades or wings of a rotary wing aircraft are secured to the rotor head in a non-rigid manner by means of a carrier bar, however, without any flapping hinges and without any lagging hinges. The carrier bar is supported on the rotor head. The connection of each wing to the respective end of the carrier bar is such, that the longitudinal wing axis is excentrically displaced relative to the central longitudinal axis of the carrier bar in the direction in which the forces of the air are effective. The displacement or spacing between the two axes is such that at least a partial compensation of the occurring bending moments is achieved.

8 Claims, 5 Drawing Figures

HELICOPTER ROTOR STRUCTURE

BACKGROUND OF THE INVENTION

The invention relates to a rotor structure for rotary wing aircraft, especially helicopters in which the rotor blades are respectively connected to a carrier beam or bar in a non-rigid manner and without any flapping and lagging hinges. The carrier bar is supported by the rotor head. A bending moment is effective at each rotor blade or wing as a result of the centrifugal force. The just mentioned bending moment is effective in a direction opposite to the bending moment produced by the forces of the air. Under normal or rated operating conditions the bending moment caused by the forces of the air is balanced by the bending moment caused by the centrifugal force, as far as the static moment components are concerned in the area of the blade connection to the rotor head.

In connection with rotors for rotary wing aircrafts, especially helicopter main rotors, it is known to arrange the blades in such a manner that the longitudinal wing or blade axis extends at a fixed angle, the so-called cone angle, so that the center of gravity of the wing is located, on the average, so far above the blade connection point that a torsional moment balance establishes itself at the rated load and rated r.p.m. of the rotor in the area of the blade connection point, said balancing being accomplished between the bending moment produced by the centrifugal force effect due to the elevated center of gravity and between the bending moment resulting from the forces of the air. The foregoing applies, as mentioned, particularly to the main rotor of a helicopter in which the rotor blades are rotatably supported by a blade angle bearing secured to the rotor head and permitting the angular movement necessary for the adjustment of the pitch angle.

For the purpose of achieving said balancing, the longitudinal blade or wing axis and the axis of the blade angle bearing are arranged coaxially relative to each other. In addition, the just mentioned two axes extend together at the so-called cone angle relative to the rotational plane of the rotor, said cone angle being within the range necessary for the balancing of the bending moments. In this connection reference is made to British Pat. No. 639,572 and German Pat. No. 1,531,375. This type of arrangement has manufacturing disadvantages because it is necessary to adapt the supporting elements of the rotor head including the respective rotor head bores to said angular or slanted position unless the cone angle is located in the area of the blade connection. Where blade angle bearings are used such locating of the cone angle, means that the blade connection point is positioned radially outwardly of the blade angle bearing. In that instance the respective angle is the so-called pre-droop angle. On the one hand, this type of arrangement simplifies the construction of the rotor head where the center line of the carrier beam extends perpendicularly to the rotational axis of the rotor and where a control axis cone angle results which has an angular value of zero degrees. However, the longitudinal axis of the wing or blade travels, due to motions adjusting the pitch angle, on a straight circular cone having a relatively large opening angle which corresponds to the cone angle necessary for the complete bending moment balance. As a result, the blade or wing performs simultaneously with the pitch angle adjusting movement, movements in the lagging direction which increase in the direction toward the wing tip. Such movements are disadvantageous, especially with regard to the control or steering characteristics of the rotor.

OBJECTS OF THE INVENTION

In view of the foregoing, it is the aim of the invention to achieve the following objects singly or in combination:

to provide a rotor of the type described which will not require the fixed cone angle as employed heretofore for the balancing of the bending moments while simultaneously exhibiting an advantageous steering or control characteristic and having a simple construction of the rotor head;

to compensate or balance the static bending moment components in the flapping direction of the rotor blades;

to incline the longitudinal blade axis so that the respective angle is smaller than the cone angle required for the complete bending moment balance;

to achieve an advantageous compromise between the several requirements, namely, that it must be easy to steer the rotor structure, to provide a simple structural form, to assure an advantageous force distribution while simultaneously achieving good damping characteristics;

to influence in a desired manner the force distribution and the flying as well as steering characteristics of the rotor;

to substantially reduce the required steering or control forces;

to minimize the bending moment loads on the rotor structure; and to reduce the customary cone or pre-droop angle to a desired value, including to zero and to simultaneously assure an advantageous flying characteristic as well as a good steering characteristic of the rotor.

SUMMARY OF THE INVENTION

The above objectives are achieved, according to the invention, in a rotor structure characterized in that the longitudinal wing axis is arranged in the area of the blade connection to extend excentrically and with a spacing relative to the longitudinal center line of the carrier beam or bar, said spacing being sufficient to assure at least a partial bending moment balancing or compensation, said spacing extending in the direction in which the forces of the air are effective. Since it is normally sufficient to balance the static bending moments components in the flapping direction of the rotor blades, it is preferable to displace the longitudinal blade axis relative to the central line of the carrier bar in the direction in which the wing lifting force is effective.

To assure a structural shape of the rotor which is as simple as possible, it is suitable that the center line of the carrier bar and the blade longitudinal axis extend perpendicularly to the rotational axis of the rotor in the area of the blade connection. In addition, the axis and said line are displaced relative to each other by the spacing necessary for a complete bending moment balancing. However, if desired it is possible to arrange the longitudinal blade axis in the area of the blade connection so that additionally to the excentric arrangement it also extends at a cone angle relative to the rotational plane of the rotor. This combination of features, namely, the excentric and slanted arrangement of the longitudinal blade axis makes it possible to vary the slant angle of the longitudinal blade axis in a wide range depending on the size of the selected excentricity. In any event, said slant angle of the longitudinal blade axis will be smaller than the cone angle which is conventionally necessary for the complete balancing of the bending moments. Thus, the invention makes it possible to achieve a compromise which is most advantageous for any particular circumstances to thereby achieve an easy steering of the craft, a simple structure especially for the rotor assembly, as well as an advantageous force distribution and good damping characteristics of the rotor. In this instance it is especially preferred that the longitudinal blade axis extends in the area of the blade connection at said slanting angle relative to the center line of the carrier bar, whereby the latter extends perpendicularly to the rotational axis of the rotor. This combination of an excentric arrangement with the above mentioned pre-drooping of the longitudinal blade axis results in a simple physical structure of the rotor with a control axis cone angle of zero degrees. The just mentioned combination also results in a pre-droop angle which becomes smaller with an increasing excentricity. Therefore it is possible to adjust said pre-drooping angle so that the disadvantageous effects of the conventional so-called pre-drooping are eliminated or at least reduced to an acceptable extent.

Where a blade angle bearing is employed which supports the wing rotatably on the rotor head for accomplishing the adjustment of the pitch angle, it is possible to influence the force distribution as well as the flight and control characteristics of the rotor by adjusting the axis of the blade angle bearing relative to the longitudinal blade axis and/or relative to the longitudinal center line of the carrier bar. Where it is intended that the wing or blade shall merely rotate about the longitudinal blade axis when the pitch angle is adjusted, the blade axis shall extend coaxially to the axis of the blade angle bearing in the area of the blade connection. However, it is preferable that the longitudinal blade axis extends in the area of the blade connection with a spacing relative to the axis of the blade angle bearing, whereby an excentric arrangement of the longitudinal blade axis and of the blade angle bearing axis is accomplished. This feature has the advantage that it is possible to reduce the necessary control forces in most instances by a relatively small spacing between the two axes. In this combination the blade will move in addition to rotating about its longitudinal axis when the pitch angle is adjusted, also along a circular path about the blade angle bearing axis. However, the extent or size of this circular movement is small corresponding to the relatively small axial spacing between the bearing axis and the blade axis. Further, the small circular movement is uniform along the entire length of the blade or wing.

It is also preferable that two rotor blades located diametrically opposite each other are fixedly interconnected by means of a carrier beam or bar extending from one blade root to the other, and being supported on the rotor head by means of the blade angle bearings. This feature assures a further reduction in the bending moments because the bending moments resulting from the resonance oscillations of the opposite rotor blades are compensated along with the centrifugal forces through the carrier bar. As a result, the rotor head is substantially subject only to cross forces in the area of the blade angle bearings without any need for twisting the carrier bar in the torsion direction when the wings are angularly adjusted in a cyclical manner. In this connection it is especially practical to locate the blade angle bearings in recesses of the carrier bar and to construct the angle bearings as so-called inner bearings. For safety purposes it is preferable that each blade angle bearing is also constructed as an emergency support bearing.

In the light of the foregoing disclosure it will be appreciated that in a rotor according to the invention it is possible to reduce the code angle or pre-droop angle to substantially zero degrees due to the excentric arrangement of the longitudinal blade axis and the neutral center line of the carrier bar which is advantageous for the balancing of the bending moments in the area of the blade connection. Simultaneously it is possible to employ small control forces while simplifying the structural features of the rotor head and nevertheless achieving advantageous flying and steering characteristics of the rotor. The invention is especially applicable to rotor structures without flapping hinges and without lagging hinges which rotors are, nevertheless, non-rigid rotors, and wherein the carrier bars are rotatably supported by the rotor head by means of blade angle bearings.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
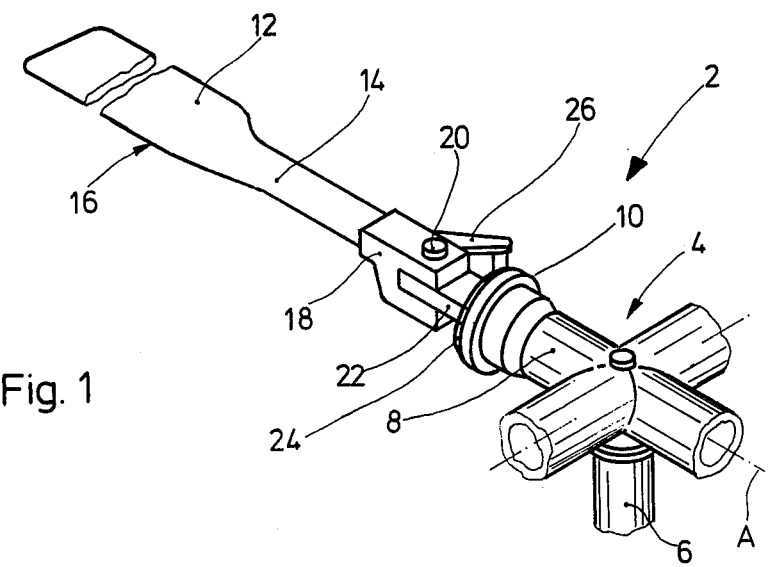
FIG. 1 is a partial perspective illustration of a four wing rotor, only one rotor blade or wing being shown.

Referring to FIG. 1 the rotor 2 comprises a rotor head 4 rigidly connected to the rotor shaft 6 and comprising four rotor arms 8, each carrying a blade angle bearing 10 at its end. Each blade angle 10 supports its respective rotor blade 16 on the rotor head 4 so that the rotor blade 16 is rotatable about the angle bearing axis A. Each rotor blade 16 comprises a wing section 12 extending all the way to the wing tip and a neck section 14 which is relatively yielding against bending in the flapping direction as well as in the lagging direction but which is simultaneously substantially resistant against torsion loads. The rotor blade 16 is secured to the blade angle bearing 10 by means of a fitting 18 holding the blade at its root. The fitting 18 has a forked end to which there is secured one end of a carrier beam 22 by means of one or more connecting bolts 20. The other end of the carrier beam 22 is secured to an inner sleeve 24 of the blade angle bearing 10. The inner sleeve 24 is rotatable about the bearing axis A. The connection between the fitting 18 and the inner sleeve 24 is rigid, stated differently, this connection does not allow for flapping motions nor for lead-lag motions. The angular adjustment motion of the blade or wing is controlled in a known manner by means of control rods not shown. The control rods would be pivoted to a steering member or horn 26 which in turn is secured to the carrier beam 22.

Figure 2:
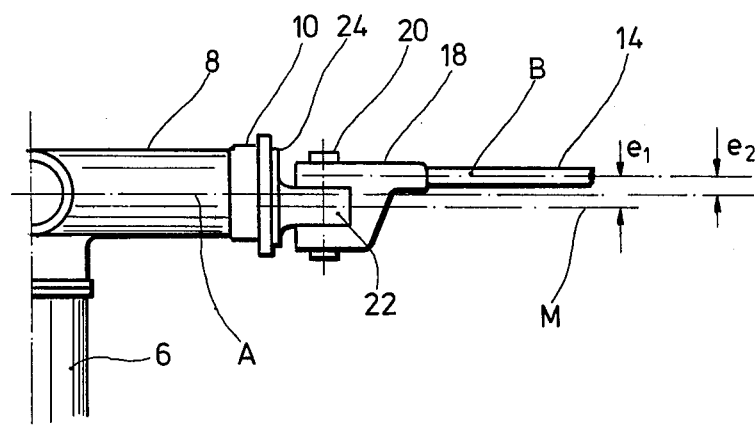
FIG. 2 is a schematic side view of one half of the rotor head according to FIG. 1.

The fitting 18 is constructed to be excentric so that the longitudinal blade axis B extends above the axis M of the beam 22 in the area of the blade connection and spaced in the flapping direction. As illustrated in FIG. 2, the blade longitudinal axis B and the neutral center line M of the beam 22 extend perpendicularly to the rotational axis of the rotor and in parallel to each other, whereby the mutual spacing $e_1$ is selected so that the bending moment produced by the air lifting forces which are effective on the rotor blade 16 and the counter moment caused by the centrifugal force effective on the center of gravity of the blade due to said excentricity $e_1$ compensate or balance each other with regard to their static moment components in the area of the blade connection and when the rotor rotates at its nominal r.p.m. and under its nominal load. The size of said excentricity $e_1$ depends on the type of rotor and in a typical example it may be within the range of about 25mm.

In order to minimize the steering forces necessary for the angular adjustment of the blades, it is possible to arrange the longitudinal blade axis B so that it also extends excentrically and not coaxially relative to the axis A of the blade angle bearing. Depending on the particular circumstances of the rotor involved, the longitudinal blade axis B may be arranged more or less above or below the blade angle bearing axis A. As shown in FIG. 2, the longitudinal blade axis B extends in the area of the blade connection in parallel and above the angle bearing axis A and spaced by the spacing $e_2$.

Figure 3:
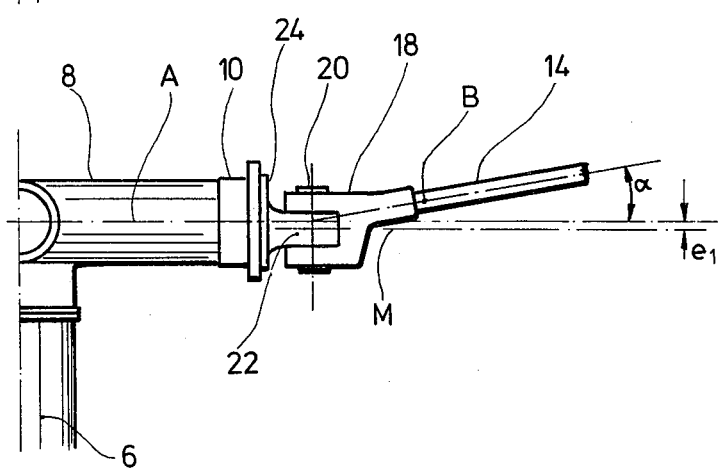
FIG. 3 is a view similar to that of FIG. 2, however, with a modified arrangement of the axes.

FIG. 3 shows a modification of the axes arrangement in which the blade longitudinal axis B extends excentrically relative to the center line M of the bar 22 and simultaneously at a cone angle $\alpha$ which is illustrated in a much enlarged manner for clarity's sake, but which in actuality is substantially smaller, whereby the longitudinal blade axis B slants relative to the plane defined by the rotor rotation, whereas the angle bearing axis A and the center line M of the bar 22 extend in parallel to each other and perpendicularly to the rotational axis of the rotor shaft. The balancing or compensation of the bending moments in the area of the blade connection bolt 20 is due to the combined effect of the cone angle $\alpha$ on the one hand, and the excentricity $e_1$ on the other hand, between the center line M and the longitudinal blade axis B. Thus, according to the invention it is possible to make the angle $\alpha$ substantially smaller than has been possible heretofore in connection with the conventional cone or pre-droop angle which heretofore was solely responsible for the compensation of the bending moment components. In the just described example embodiment, the longitudinal blade axis B does not extend excentrically relative to the angle bearing axis A in the area of the blade connection, rather, the axis B and the axis A intersect at the connecting bolt 20.

Figure 4:
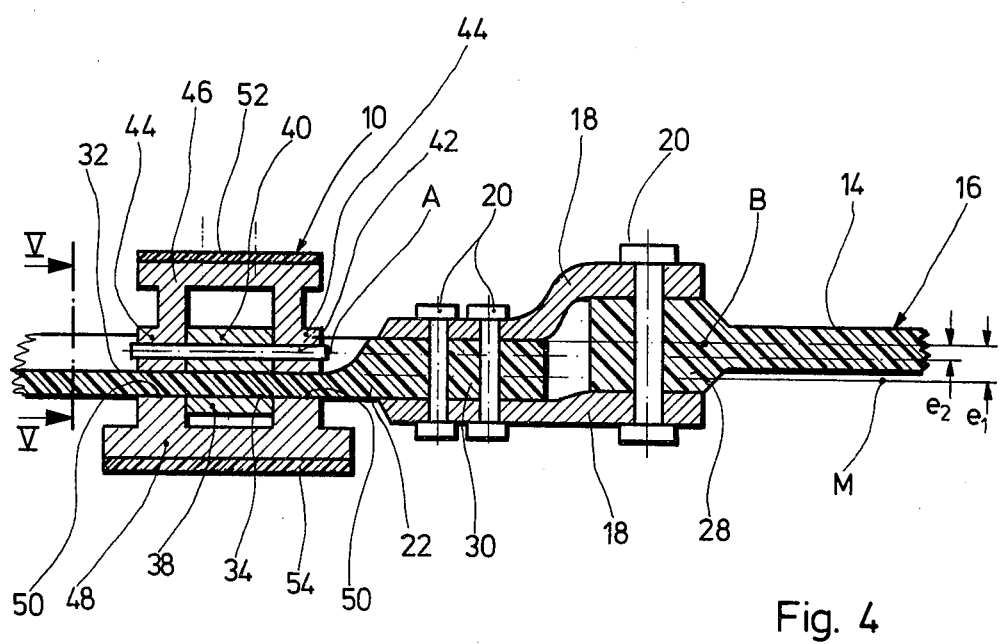
FIG. 4 illustrates a sectional view through the blade connection area of a further embodiment of the invention.
Figure 5:
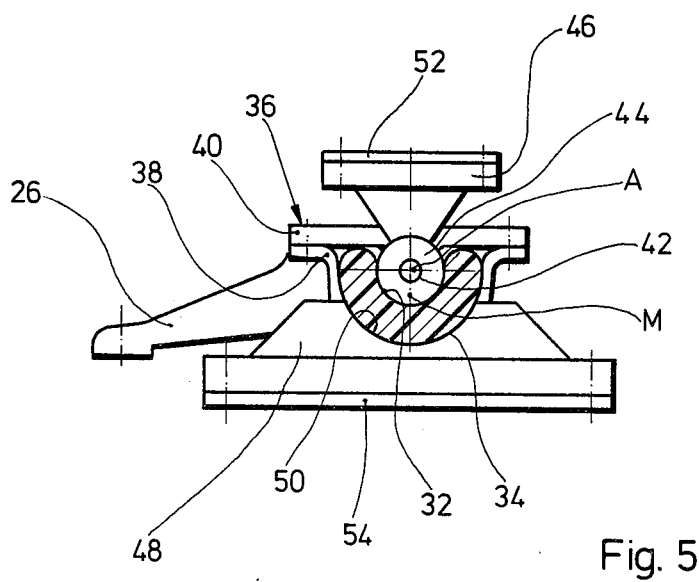
FIG. 5 shows a view partially in section along the section line V—V in FIG. 4 viewing in the direction of the arrows.

FIGS. 4 and 5 illustrate a preferred example embodiment of the invention, whereby the structural components corresponding to those shown in FIGS. 1, 2, and 3 are designated by the same reference numbers.

The rotor blade 16 is, similarly as in FIG. 2, connected with its neck section 14 to one end of the carrier beam 22 by means of a bolt 20. The neck section 14 is relatively yielding against bending in the lagging direction as well as in the flapping direction. A fitting 18 which is excentrically angled holds the reinforced blade root 28 in a surrounding manner. The end 30 of the carrier beam 22 is also reinforced. The carrier beam 22 is supported on the rotor head (not shown) by means of the blade angle bearing 10. The connection by means of the bolts 20 is such that the longitudinal blade axis B is spaced or displaced relative to the neutral central line M of the bar 22 in the area of the blade connection. The spacing $e_1$ extends in the direction of the lifting forces of the air and is sufficient for the compensation of the bending moments. Thus, the spacing extends upwardly or above the center line M as shown in FIG. 4. In addition, and in order to reduce the steering forces, the blade axis B is also spaced excentrically by the spacing $e_2$ relative to the blade angle bearing axis A, whereby the axes A, B, and M extend in parallel to each other and perpendicularly to the rotational axis of the rotor shaft.

The other end of the carrier bar 22 is secured in the same manner to the other rotor blade of the pair which is located diametrically opposite the just described blade connection. Further, the bar 22 is also supported at its other end in a rotatable manner relative to the rotor head by a second blade angle bearing. The bar 22 is resistant against tension stress, whereby it is capable to take care of a direct compensation of the oppositely directed centrifugal forces between the rotor blades forming a pair and arranged diametrically opposite each other. In addition, the bar 22 is substantially resistant against bending in the lead-lag direction as well as in the flapping direction. The term "resistant against bending" in this context means that the bar 22 is capable of taking up bending loads and is capable of bending to the degree necessary to transmit the dynamic bending moments components resulting from the resonance oscillations of the rotor blades 16, between these diametrically, oppositely arranged rotor blades of a pair. This type of arrangement in combination with the support of the beam 22 at both of its ends results in a substantial relief of the rotor from bending loads without impairing the aeroelastic characteristics of the rotor. The bar 22 is supported on the rotor head by means of blade angle bearings 10 located at a large spacing relative to each other and radially outwards on the rotor head ring not shown. These blade angle bearings 10 will be described in more detail below, but it should be mentioned here already that they permit a bending, however slight, of the bar 22, thereby contributing to a substantial reduction of the bending load on the rotor.

The just described embodiment constitutes a substantial improvement on the one hand relative to the embodiment of FIGS. 1 to 3, as well as relative to prior art rotor structures. Although in the embodiments of FIGS. 1 to 3 the rotor blades 16 are rigidly secured at one end to the angle bearings 10, whereby the dynamic bending moment components cause higher loads on the bearings 10 and on the rotor, the embodiment of FIG. 1 and 3 is still an improvement relative to prior art rotor structures in which the support beams are soft relative to bending in the flapping direction and/or in the lead-lag direction, and wherein the support bars are supported adjacent to the rotational axis of the rotor by means of one or several closely spaced bearing locations. Such prior art support of the bars interconnecting the wings or blades across the rotor structure results in too large bending moment peaks in the area of the rotational axis of the rotor as well as in a disadvantageous position of the flapping hinges or lagging hinges. Besides, the prior art type of rotor structure generally is subject to rather disturbing flutter movements. Contrary thereto, in the embodiment according to the invention as shown in FIGS. 4 and 5, substantially only cross forces are transmitted from the bearings 10 to the rotor head and the maximum load of the bar 22 which is resistant against bending, is substantially reduced as compared to the peak load values occurring in prior art rotor structures.

The carrier bar 22 is constructed to be elastic relative to torsion loads within predetermined limits in order to permit an angular movement of the two individual blades or wings 16 which are interconnected by the bar 22. Since the bar 22 is supported on the rotor head for rotation about its entire length, it is merely necessary to twist the bar 22 between its ends in a torsion elastic manner by the angle corresponding to the range of rotation angle through which the blades are moved for collectively adjusting the pitch angle. The cyclical angular adjustment or control of the blades takes place without any torsion loads on the bar 22. During this latter, cyclical blade angle adjustment the bar is rotated about its entire length around the axis A of the blade angle bearings.

Having regard to the fact that the bar 22 is supposed to be substantially resistant against tension stress and bending loads and that it is also supposed to be elastic with regard to torsion loads within certain limits, it is suitable to manufacture the bars 22 from composite fiber material, wherein the fibers extend uniformly in the same direction, and whereby the fibers surround the connecting bolts 20 in the area of the bar ends 30 in the manner of a loop. Further, the bar 22 is provided with an open, hollow cross section which may, for example, have a U-shaped form, as shown in FIG. 5 in the area of the angle bearing 10. The hollow cross section is formed with inner and outer ring surfaces 32 and 34 extending concentrically about the angle bearing axis A. Since the rotor blades 16 are also made of a reinforced fiber plastic material, the bar 22 and the rotor blades 16 may be manufactured as a unitary, integral structure in which the fibers extend uniformly in the same direction, whereby the fibers are bent in the area of the blade connection to provide for the spacing $e_1$. If desired, the bar 22 may be subdivided in the area of the rotational shaft of the rotor.

The angle bearing 10 comprises a bearing housing 36 rigidly secured to the bar 22 and having a lower housing portion 38 reaching around the outer side of the bar 22 and to which the steering horn or member 26 is secured. The bearing housing further includes an upper housing portion 40 fitting into a recess of the U-shaped bar 22 and secured to the lower housing portion, for example, by screws. The upper housing half 40 supports a journal pin 42 which defines the angle bearing axis A. The journal pin 42 is supported at both ends in a rotatable manner in the journal bosses 44 of a bearing block 46. The bosses 44 reach into the hollow section of the bar 22. The bearing block 46 is rigidly secured to the rotor head.

Further, the angle bearing 10 is constructed to operate as an emergency support bearing in case the bearing journal pin 42 should break or should be subjected to an overload. For this purpose the bearing bosses 44 cooperate with the inner ring surface 32 of the bar 22 in a gliding fit. A two pronged bearing shell 48 is secured to the rotor head at the underside of the bar 22. The bearing shell 48 comprises bearing surfaces 50 extending concentrically relative to the angle bearing axis A and cooperating in a sliding manner with the outer ring surface 34 of the bar 22. If the bearing or journal pin 42 should break or be subject to an overload, the bar 22 is supported by the ring surfaces 32, 34 between the bosses 44 of the bearing block 46 and by the bearing surfaces 50 of the bearing shell 48, whereby it is rotatable about the angle bearing axis A relative to the rotor head. The ring surfaces 32, 34 may be coated with a friction reducing material, for example, a layer of polytetrafluoroethylene.

In order to permit for a bending of the bar 22 between the bearings 10, at least one of these bearings is constructed to provide for an axial movement of the bar 22, whereby the latter may, in the manner of a pivot or self-aligning bearing, also perform lagging motions in the lead-lag direction and in the flapping direction relative to the rotor head. This is accomplished by means of the intermediate layers 52 and 54 of elastic material. These layers are located at the connection points between the bearing block 46 and the rotor head and between the bearing shell 48 and the rotor head. For centering the assembly comprising the bar 22 and the diametrically opposite rotor blades 16 relative to the rotor head in the direction of the center line M, the bar 22 may be secured to the rotor shaft by a centering device which cannot be displaced in the axial direction of the rotor shaft, but which permits a bending of the bar 22 in the lead-lag and flapping direction as well as a rotational movement of the bar 22. Alternatively, one of the blade angle bearings 10 may be constructed to permit an axial movement of the bar 22 while the other angle bearing 10 is constructed as an axially fixed bearing. Instead of the slide bearings illustrated, it is possible to employ for the blade angle bearings 10 anti-friction bearings such as roller or ball bearings or elastomeric bearings.

Incidentally, a composite fiber material may comprise the following components which are all well known in the art, such as: carbon fibers and epoxy resin.

Although the invention has been described with reference to specific example embodiments, it will be appreciated, that it is intended to cover all modifications and equivalents within the scope of the appended claims.

What is claimed is:

1. A helicopter rotor structure comprising rotor blade means (16) including radially outer wing means (12), root means (28), and neck means (14) operatively interconnecting said wing means and said root means, said neck means being relatively yielding against bending in the lead-lag direction and in the flapping direction, said blade means being rotatable in a rotational plane, rotor head means (4) having a rotational axis and including carrier bar means (22) and means (18) securing said root means to said carrier bar means (22) in a manner rigid against bending, said carrier bar means (22) having a longitudinal neutral center line (M), said blade means having a longitudinal blade axis (B), said securing means providing a spacing ($e_1$) between said neutral center line (M) and said longitudinal axis of said blade means, said spacing extending eccentrically from said neutral center line (M) in the direction of the effective lifting air forces, at the junction of said carrier bar means and said root means to such an extent that the static bending moment components caused by the centrifugal forces at the nominal r.p.m. of said rotor structure and the bending moment components caused by said effective lifting air forces completely compensate each other whereby the static bending moment loads are zero in the zone where said root means are secured to said carrier bar means.

2. The rotor structure of claim 1, wherein said securing means connects the respective blade means to said carrier bar means in such a manner that said longitudinal blade axis extends at an angle ($\alpha$) relative to said rotational plane of said rotor structure in addition to the eccentrical spacing ($e_1$) between said neutral center line and said longitudinal blade axis.

3. The rotor structure of claim 2, wherein said securing means include blade fitting means inclined so that said angle ($\alpha$) extends between said longitudinal neutral center line of said carrier bar means and said longitudinal blade axis, said longitudinal neutral center line of said carrier bar means extending perpendicularly to said rotational axis of said rotor head means.

4. The rotor structure of claim 1, further comprising blade angle bearing means operatively supporting a blade on said rotor head means, said blade angle bearing means having a bearing axis (A), said longitudinal wing axis (B) and said bearing axis (A) extending coaxially relative to each other in the area where the blade is connected to the carrier bar means.

5. The rotor structure of claim 1, further comprising blade angle bearing means operatively supporting a blade on said rotor head means, said blade angle bearing means having a bearing axis (A), wherein said bearing axis (A) and said longitudinal wing axis (B) are spaced from each other by a spacing ($e_2$) for reducing the steering forces.

6. The rotor structure of claim 1, wherein a pair of said rotor blade means arranged diametrically opposite each other, is connected to the respective carrier bar means extending intermediate the root means of the interconnected blade means, said carrier bar means being substantially resistant relative to tensile stress and bending stress as well as elastic relative to torsion loads, and blade angle bearing means operatively supporting said carrier bar means on said rotor head means.

7. The rotor structure of claim 6, wherein said carrier bar means comprise recess means, said blade angle bearing means being located in said recess means thereby forming an inner bearing.

8. The rotor structure of claim 7, wherein said blade angle bearing means comprise emergency support means.

* * * * *